J. B. BLAIR
AUTOMOBILE DIRECTION INDICATOR.
APPLICATION FILED MAY 9, 1917.

1,333,534.

Patented Mar. 9, 1920.

Witnesses:
W. F. Kilroy
Harry R. L. White

Inventor:
James B. Blair

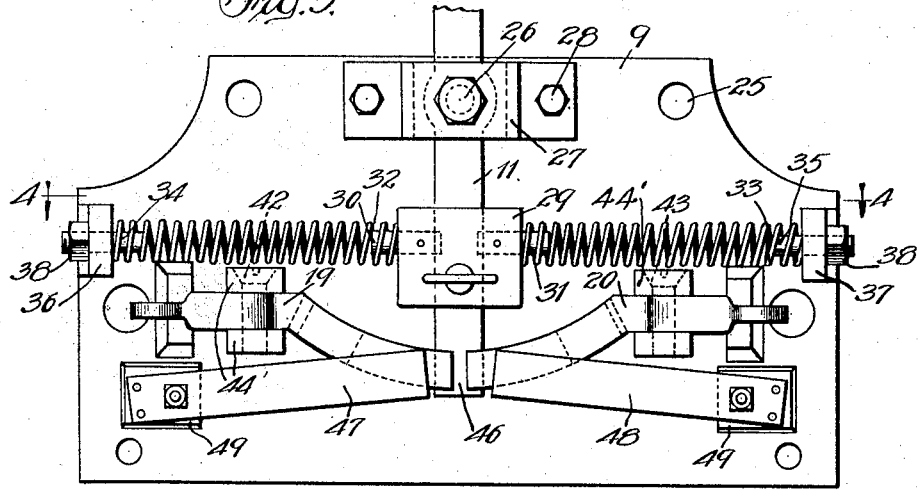

J. B. BLAIR.
AUTOMOBILE DIRECTION INDICATOR.
APPLICATION FILED MAY 9, 1917.
1,333,534.
Patented Mar. 9, 1920.
3 SHEETS—SHEET 3.
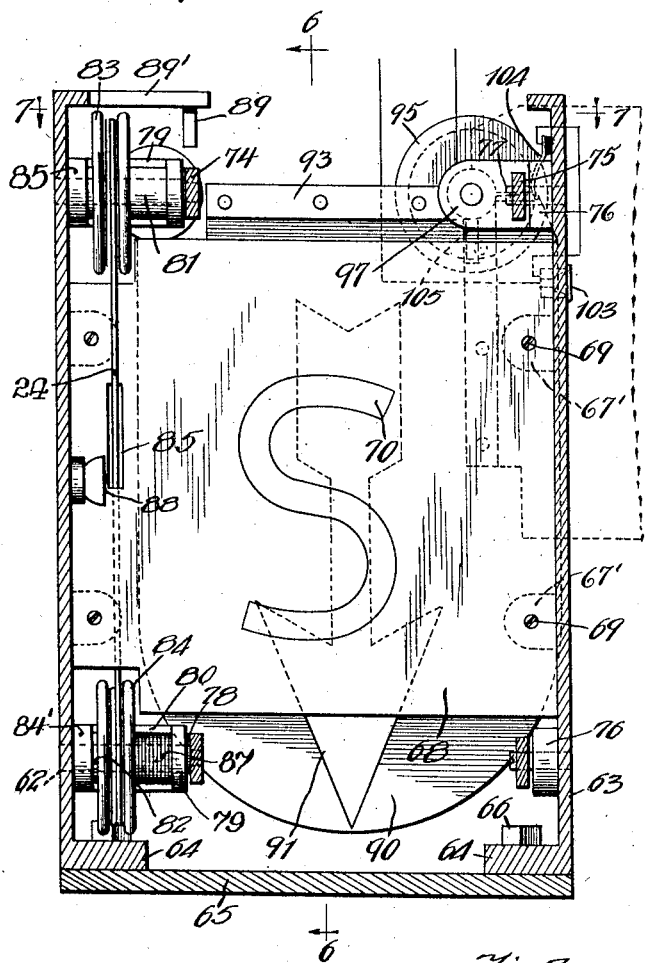
Witnesses:
W. P. Kilroy
Harry R. L. White
Inventor.
James B. Blair
By Brown, Hanson & Boettcher
Attys

UNITED STATES PATENT OFFICE.

JAMES B. BLAIR, OF DECATUR, ILLINOIS.

AUTOMOBILE DIRECTION-INDICATOR.

1,333,534.     Specification of Letters Patent.     Patented Mar. 9, 1920.

Application filed May 9, 1917. Serial No. 167,431.

*To all whom it may concern:*

Be it known that I, JAMES B. BLAIR, a citizen of the United States, residing at Decatur, in the county of Macon and State of Illinois, have invented a certain new and useful Improvement in Automobile Direction-Indicators, of which the following is a full, clear, concise, and exact description, reference being had to the accompanying drawings, forming a part of this specification.

The present invention relates broadly to signals and has particular reference to direction indicator operating means for motor vehicles and the like.

An object of my invention is to produce a direction indicating means which may be applied to any motor vehicle without material alteration of the structure of the same. The signal is preferably set manually at any time previous to the direction to be followed and upon following the direction indicated, the signal is automatically returned to normal position.

I also illustrate a novel form of signal and container, which is not claimed herein, for use in connection with the operating mechanism referred to in the foregoing. The signal is arranged on the rear fenders of the motor vehicle and preferably consists of two units, that is, a signal on each fender, but I do not limit myself to this arrangement.

Other objects and advantages of my invention will appear from the following detailed description and the claims, taken with an inspection of the accompanying drawings, in which—

Fig. 3 is an enlarged elevation of the signal operating lever and catch mechanism therefor;

Fig. 4 is a longitudinal section on the line 4—4 of Fig. 3 looking in the direction of the arrows;

Fig. 5 is a vertical section of the signal housing from the front of the housing;

Fig. 6 is a vertical section taken on the line 6—6 of Fig. 5 looking in the direction of the arrows;

Fig. 7 is a transverse section of the same taken on line 7—7 of Fig. 5, looking in the direction of the arrows;

Fig. 8 is a fragmental elevation of the rear wheels and fender of a motor vehicle showing one of the signal housings mounted in operative position thereon;

Fig. 9 is a perspective view of the yieldable connection between the operating cable and the steering mechanism of the car.

Figure 1:
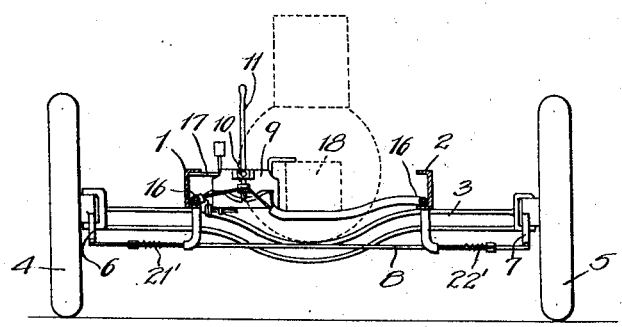
Figure 1 is a semi-diagrammatic section of a motor vehicle showing one location of the signal operating lever and cables.
Figure 2:
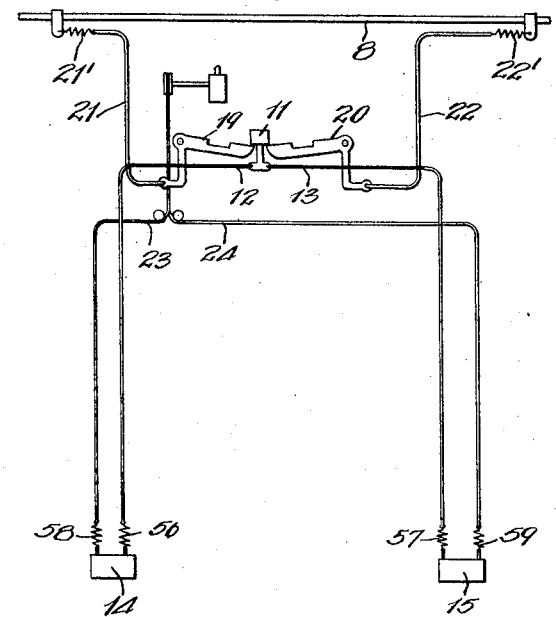
Fig. 2 is a diagrammatic plan view of the same.

Referring more particularly to the drawings, and specifically to Figs. 1 and 2, I have illustrated in diagrammatic form the side channels 1 and 2 of the chassis of a motor vehicle, said channels being supported in the usual way on the front or steering axle 3. The steering wheels 4 and 5 are mounted on stub axles from which extend arms 6 and 7 connected by a shift rod 8. The shift rod is connected in the usual manner to the steering mechanism of the motor vehicle.

A base plate 9 is mounted in any suitable manner, preferably beneath the flooring of the car, and on said plate is pivotally mounted at 10 a lever 11. Cables 12 and 13 extend from the lever 11 to the signal housings 14 and 15 mounted at the rear of the motor vehicle on the rear fenders thereof. Of course, one signal housing can be provided as will appear later. The cables 12 and 13 extend through suitable housings 16 supported on the lower portions of the channel members 1 and 2. The base plate 9 is supported preferably by a frame 17 extending between the side member 1 and the gear casing 18, the latter being shown in dotted lines in Fig. 1.

When the lever 11 is shifted, said lever projecting at a point within easy reach of the driver, a signal is given at one of the housings 14 or 15, as the case may be, to indicate the direction which the driver intends to take. Spring means is provided to maintain the lever in neutral position, as will hereinafter appear.

In order to maintain the lever in the position to which the same has been moved, I provide a pair of pawl members 19 and 20 pivoted on the plate 9 in a manner which will hereinafter appear in detail. The pawl members are connected by means of cables 21 and 22 to the shift rod 8, thus when the lever 11 is shifted to give an indication of direction, said lever will engage the notches in one of the pawl members and be retained in the indicating position. As soon as the vehicle starts to turn or has completed half of the turn in the direction indicated one or the other of cables 21 or 22 will act on its respective pawl releasing the lever and permitting the latter and the signal to return to normal, non-indicating position.

To give an indication of an intended stop a pair of cables 23 and 24 are connected to the foot brake of the motor vehicle. These cables 23 and 24 extend to suitable stop indicating mechanism carried in the housings 14 and 15, and described in detail later.

The signal actuating mechanism consists of the base plate member 9 which is provided with a plurality of openings 25 at suitable points to receive fastening members which are adapted to engage the frame 17 hereinbefore described, or any other supporting member. The lever 11 is pivoted on the plate 9, as at 26, in a bracket 27, said bracket being secured to the plate by means of bolts 28 or the like. A block 29 is carried by the lever 11 below the pivot point and above the lower end of the lever, said block having oppositely extending projections 30 and 31 carried thereby. A pair of coil springs 32 and 33 are provided, said springs having their inner ends engaged over the projections 30 and 31 and their outer ends engaged with pins 34 and 35 carried by lugs 36 and 37 cast integrally with the plate 9. Nuts 38 serve to prevent displacement of the pins 34 or 35. The springs 32 and 33 being of approximately the same length and strength, the lever 11, when in normal position, will be maintained vertical. An arm 40 extends outwardly from the block 29 and is provided with an apertured head 41 to which the cables 12 and 13 are connected.

The catch pawls 19 and 20, hereinbefore referred to, are preferably of substantially bell crank shape and are pivoted on screws 42 and 43 between lugs 44' cast integrally with the plate 9. The cables 21 and 22 are connected to the free ends of the outer arms 19' and 20' of said pawl. The catch arms of the pawls are provided with notches 44 and 45 on their inner faces, said faces being in normal position slightly inclined relative to the plate 9. The catch portions of said pawl members are also arcuate in shape to conform to the path of travel of the free end 46 of the lever 11. Flat spring members 47 and 48 anchored on blocks 49 cast integrally with the plate 9 bear upon the arcuate portions of the pawl members so as to maintain the same in position to automatically engage the free end of the lever, 11. Stop members 50 are cast integrally with the plate 9 and project adjacent the outer arms 19' and 20' of said pawls so as to limit the movement of the same.

In Fig. 9 is illustrated in enlarged form the connection between cables 21 and 22 and the shift rod 8. In order that the cables 21 and 22 be maintained taut at all times I insert coil spring members 21' and 22' therein, said coil spring elements carrying clamping members similar to that shown in Fig. 9.

The clamping member preferably comprises a block 51, said block having a jaw 52 cast integrally therewith, the inner surface of the jaw being serrated. A removable jaw 53 is provided, said removable jaw being secured to the jaw 52 by means of the screw 54 or the like. The inner surface of the jaw 53 is also serrated. A threaded bar 55 passes through the block 51 and is secured therein by means of a nut 56' and a suitable nut lock. The free end of the coil spring is connected to an eye formed in the opposite end of said bar 55, the opposite end of the spring being connected to the cable. By using the clamp shown in Fig. 9, the cables 21 and 22 may be connected to the standard shift rod with the use of nothing more than a screw driver. Suitable coil springs 56, 57, 58 and 59 are interposed in the cables 12, 13, 23 and 24, respectively, said coil springs being of the tension type and being normally distended so as to take up slack in the cables, and still not prevent the proper manipulation of the signals. One of the signal housings is shown applied in Fig. 8 and is designated H in its entirety.

In Figs. 5 to 7 I have illustrated a form of signal particularly adapted for use with my novel operating mechanism. A housing designated H in its entirety is provided and is composed of the side walls 62 and 63 provided with base flanges 64, serving to secure the walls in spaced relation on a base plate 65 by means of bolts 66 or the like. The upper end of the walls 62 and 63 are connected by a top plate not shown. As shown in Fig. 8, the base plate 65 is bent to conform to the rear extremity or rear fender or mud guard designated 66', bolts or the like 67 serving to secure said base plate to the mud guard.

The side walls 62 and 63 are provided with complementally located lugs 67' to which is secured a sign plate 68, screws or the like 69 serving to connect said plate to said lugs. The plate 68 is adapted to contain on the outer face thereof a large letter such as the letter S as indicated at 70 to designate "stop."

In order to conceal the stop signal and to expose the same at the proper times, I provide a pair of shutters 71 and 72 which are substantially identical in construction. As best shown in Figs. 6 and 7 the shutters are each provided with a U-shaped bracket 73, said bracket having two arms 74 and 75. A pair of enlargements 76 are formed on the inner surface of the wall 63 to receive a pair of pins 77, said pins being threaded into said enlargements or otherwise secured thereto. The arms 74 are provided with polygonal openings and the arms 75 with circular openings, the circular openings being adapted to receive the pins 77 and the polygonal openings adapted to receive the squared ends of trunnion shafts 78. Said trunnion shafts are mounted in bearing brackets 79 and 80 and form portions of the hubs 81 and 82 of sheaves 83 and 84, the opposite ends of the hubs of said sheaves having bearings in suitable enlargements 84' formed on the side wall 62, as best shown in Figs. 5 and 7. The housing shown in Figs. 5 to 7 inclusive is that which will be mounted on the right hand rear fender and hence the cable 24 would lead to the shutter mechanism, this cable being best shown in Figs. 5 and 6 and passing from the conduit 84' up over the sheave 83, around said sheave once or twice and downwardly diagonally through a slot 85 formed in the plate 68, the free end of the cable 24 being wound about the sheave 84 at least once and connected to said sheave at the point 86. Thus, it will be seen that when a pull is directed upon the cable 24 as indicated by the arrow A, in Fig. 6, the sheaves 83 and 84 will be caused to rotate in opposite directions and swing the shutter sections open, exposing the letter S and thereby indicating to a vehicle following that the driver intends to stop. A coil spring 87 on the hub 82 of the sheave 84 serves to close the shutter sections after the cable is released. For use in darkness a small incandescent lamp 88 is mounted on the wall 62 about midway the length of the plate 68 and a contact 89 serves to control the supply of current, said contact being arranged in the path of movement of the arm 74 of the upper shutter section so that when said arm strikes the contact the lamp will be lighted. Of course, any other means may be employed for closing the circuit to said lamp. A portion of the upper margin of the wall 62 is extended as at 89' to support the contact 89.

The direction indicating element includes a semaphore 90 having an indicating arrow 91 painted or otherwise placed thereon. A slot is provided in the wall 63 to permit passage of the semaphore for giving an indication. The semaphore is carried by an arm 93 extending radially from the hub 94 of a sheave 95, the free ends of the hub having trunnions 96 thereon receivable in a stationary bearing 97 and a removable bearing 98. The removable bearing 98 is provided with a foot 99 through which fastening screws or the like may pass to mount said bearing on the wall 63. A coil spring 100 surrounds one portion of the hub 94 to maintain the semaphore in the lowered on non-indicating position within the housing. The cable 13, hereinbefore referred to, is led through the housing 84' and is trained over a relatively small idler sheave 101, said sheave employing the bearing bracket 79 as one bearing and having a removable bearing 102 as its other bearing. The free end of the cable 13 is fastened to a point on the sheave 95, so that when the lever 11 is shifted and the cable is moved and a pull exerted on the sheave 95, the same will be caused to rotate against the tension of the spring 100 and expose the semaphore through the slot 92, serving to indicate an intention upon the part of the driver to turn to the right. In order to illuminate the semaphore in darkness when in the exposed position, I provide an incandescent lamp 103 mounted in the side wall 63 and adapted to project its rays upon the surface of the semaphore. The lamp is controlled by a contact 104 adapted to engage with an arm 105 carried by the hub 94 of the sheave 95 so that when the semaphore is projected outwardly, said contact is closed to light the lamp. Both of the lamps 88 and 103 may be manually controlled from the shaft of the motor vehicle so that when the same are not needed the circuit leading thereto may be disconnected.

In operation, when the driver applies the foot brakes common movement is imparted to both of the cables 23 and 24 opening the shutters 71 and 72 and exhibiting the "stop" signal on both fenders of the car. When the driver intends to turn to the right the lever 11 is shifted to the right until the lower end thereof is engaged in the notch in the pawl member 19. The lever is retained in this position and in moving the same a pull is directed upon the cable 13 causing the semaphore on the right fender to be projected outwardly indicating to the occupant of a vehicle following that the driver intends to make a turn. As soon as the turn is started, or very shortly thereafter, the movement of the rod 8 directs a pull upon the cable 21, disengaging the pawl member 19 from the lever 11 and permitting the same to return to normal position which in turn returns the semaphore arm.

Figure 10:
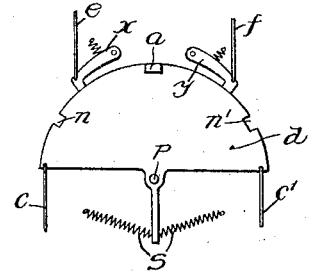
Fig. 10 is a semi-diagrammatic view of a modified form of the mechanism shown in Figs. 3 and 4.

Referring to Fig. 10 I provide a semicircular disk member $d$ the arcuate edge thereof being provided with a pair of notches $n$ and $n'$. The member $d$ is pivoted at $p$ and is actuatable by means of an upwardly projecting member $a$. The disk is adapted to be pivoted beneath the footboard of the motor vehicle on which the same is installed and the member $a$ is adapted to pass through an arcuate slot (not shown) in said foot-board in order that the same may be actuated by the driver. A pair of cables $c$ and $c'$ are connected at opposite ends of the disk. A pair of spring-pressed pawl members $x$ and $y$ are pivoted adjacent the disk and are provided with laterally bent extremities in continuous contact with the peripheral edge of the disk. A pair of cables $e$ and $f$ are connected to the pawl members, said cables being connected to the steering mechanism of the automobile similarly to the cables 21 and 22 hereinbefore described, or said cables $e$ and $f$ may be connected to the steering gear adjacent the steering knuckle. The cables $c$ and $c'$ are connected to the direction indicating signals.

In operation it is only necessary that the driver move the disk to a position out of neutral against the tension of the springs $s$ until one of the pawl members engages in one of the notches in said disk. This movement of the disk causes a direction indication to be given which is removed as soon as the vehicle starts to turn.

It will, of course, be readily apparent that various changes may be made in the detailed structure of my invention in order to facilitate application of the same to different types of motor vehicles, therefore, I reserve the right to make changes in the detailed structure thereof such as do not depart from the spirit and scope of the invention as claimed.

I claim:

1. In combination, a vehicle having steering wheels, a direction indicator on the rear end of the vehicle, means to set the indicator and means to release the indicator when the vehicle starts to turn in pursuance to the signal given.

2. In combination, a vehicle having steering wheels, direction indicating means on the rear end of the vehicle, a lever to set said means, means to retain the lever in said set position and means to disengage said retaining means and release the lever to permit the signal to return to normal position.

3. In combination, a vehicle having steering wheels, direction indicating means on the rear end of the vehicle, a lever to set said means, means to retain the lever in said set position and means connected to the steering wheel of the vehicle to disengage said retaining means and release the lever to permit the signal to return to normal position.

4. In combination, a vehicle having steering wheels, a direction indicator on the vehicle normally in non-indicating position, means for moving the indicator to indicating position, means for retaining the indicator in indicating position, and means connected to the retaining means for releasing the indicator when the vehicle starts to turn.

5. In combination, a vehicle having steering wheels, direction indicating means on the vehicle, manual means to operate first said means and automatic means to return the indicator to normal position after the vehicle starts to turn in accordance with the signal given.

6. In combination, a vehicle having indicating means thereon and steering wheels, means for manually moving the indicator to indicating position, automatic means for holding the indicator in such position, and means for automatically releasing the indicator when the vehicle starts to turn.

7. In combination, a vehicle having steering wheels, a direction indicator on one end of the vehicle, manual means to set the indicator, and automatic means to return the indicator to normal position.

8. In combination, a vehicle having steering wheels, a direction indicator on one end of the vehicle, manual means to set the indicator, and means connected to the steering wheels and operable thereby to return the indicator to normal position when the vehicle starts to turn.

9. In combination, a vehicle having steering wheels, a direction indicator on an end thereof, means to control the indicator comprising a base plate supported on the chassis, a lever pivoted on said base plate, a pair of pawl members pivoted in the path of movement of one end of said lever, means to normally maintain the lever in neutral position, said lever being connected to the indicator, and said pawls being connected to the steering wheels.

10. In combination, a vehicle having steering mechanism, an indicator on the vehicle, a base plate on the chassis having a lever pivoted thereon and connected to the indicator, means on the plate to retain the lever in positions to which the same is moved to actuate said indicator, said means being connected to the steering mechanism, whereby when the vehicle starts to turn in pursuance of the signal given said retaining means is actuated to release the lever and permit the same to return to normal position.

11. In combination, a vehicle having steering mechanism, an indicator on the vehicle, a base plate on the chassis having a spring balanced lever pivoted thereon and connected to the indicator, pawl means on the plate to retain the lever in various positions to which the same is moved to actuate the indicator, means connecting the pawl means to said steering mechanism and slack adjusting means associated with said last mentioned means.

In witness whereof, I hereunto subscribe my name this 2nd day of May, A. D. 1917.

JAMES B. BLAIR.